(12) United States Patent
Matiukas et al.

(10) Patent No.: US 11,933,484 B2
(45) Date of Patent: Mar. 19, 2024

(54) HANGING PLANTER AND LIGHT ASSEMBLY

(71) Applicants: Richard Matiukas, Aurora, IL (US); Colleen Matiukas, Aurora, IL (US)

(72) Inventors: Richard Matiukas, Aurora, IL (US); Colleen Matiukas, Aurora, IL (US)

( * ) Notice: Subject to any disclaimer, the term of this patent is extended or adjusted under 35 U.S.C. 154(b) by 344 days.

(21) Appl. No.: 17/495,368

(22) Filed: Oct. 6, 2021

(65) Prior Publication Data

US 2023/0103466 A1 Apr. 6, 2023

(51) Int. Cl.
| | | |
|---|---|---|
| F21V 33/00 | (2006.01) | |
| A01G 7/04 | (2006.01) | |
| A01G 9/02 | (2018.01) | |
| A01G 9/24 | (2006.01) | |
| F21S 8/06 | (2006.01) | |
| F21V 15/01 | (2006.01) | |
| F21V 23/00 | (2015.01) | |

(52) U.S. Cl.
CPC .......... *F21V 33/0028* (2013.01); *A01G 7/045* (2013.01); *A01G 9/024* (2013.01); *A01G 9/249* (2019.05); *F21S 8/061* (2013.01); *F21V 15/01* (2013.01); *F21V 23/001* (2013.01)

(58) Field of Classification Search
CPC ...... F21S 8/061; F21V 33/0028; A01G 9/024; A01G 9/249
USPC .......................... D11/143, 144, 155; D26/55
See application file for complete search history.

(56) References Cited

U.S. PATENT DOCUMENTS

| | | | |
|---|---|---|---|
| D175,560 S | * | 9/1955 | Nelson .......................... D11/155 |
| 3,950,637 A | * | 4/1976 | Rodin ..................... A01G 9/249 |
| | | | 248/318 |
| D253,382 S | | 11/1979 | Spruiel |
| 4,845,602 A | * | 7/1989 | Lehocki ................. A47G 7/047 |
| | | | 362/805 |
| D368,871 S | * | 4/1996 | Huff ............................. D11/144 |
| 5,860,248 A | * | 1/1999 | Peters ..................... A01G 9/024 |
| | | | 47/67 |
| 6,250,770 B1 | | 6/2001 | Countryman |
| 7,654,038 B2 | * | 2/2010 | Simmons ............... A01G 9/024 |
| | | | 47/79 |
| 8,454,209 B2 | | 6/2013 | Colby |
| 9,642,314 B1 | | 5/2017 | Joseph |
| 2006/0112633 A1 | * | 6/2006 | Humphrey ............. A47G 7/041 |
| | | | 47/66.6 |

(Continued)

FOREIGN PATENT DOCUMENTS

CA 2564520 4/2007

*Primary Examiner* — Alexander K Garlen

(57) ABSTRACT

A hanging planter and light assembly for growing a plant and illumination includes a plurality of a posts, which is engaged to and extends between a bottom plate and a top plate. A chain engaged to and extending from the top plate is engaged to an article of mounting hardware mounted to a surface to hang the hanging planter and light assembly. A bulb can be threadedly inserted into a socket, which is engaged to a lower face of the top plate. A power cord operationally engaged to the socket is used to operationally engage the socket to a source of electrical current. A pot can be inserted into an orifice, which is positioned in the bottom plate. A plant can be grown in the pot and the bulb can provide illumination to an area proximate to the hanging planter and light assembly.

15 Claims, 5 Drawing Sheets

(56) References Cited

U.S. PATENT DOCUMENTS

| | | | |
|---|---|---|---|
| 2013/0039045 A1* | 2/2013 | Colby | F21L 4/08 |
| | | | 362/183 |
| 2013/0094191 A1* | 4/2013 | Cohen | F21V 21/08 |
| | | | 362/122 |
| 2014/0022773 A1* | 1/2014 | Colby | F21S 9/037 |
| | | | 362/183 |

* cited by examiner

HANGING PLANTER AND LIGHT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to planter and light assemblies and more particularly pertains to a new planter and light assembly for growing a plant and illumination. The present invention discloses a hanging planter and light assembly comprising a plurality of posts extending between a top plate and bottom plate, with the top plate having a light and the bottom plate being configured for engaging a pot.

(2) Description of Related Art Including Information Disclosed Under 37 CFR 1.97 and 1.98

The prior art relates to planter and light assemblies. Prior art planter and light assemblies may comprise non-hangable pots from which a frame extends upwardly, with a light being engaged to the frame above the pot, hanging pots with integral lights positioned above the pots, hanging planters having lights engaged to their bottoms, plant stands with integral lights, pot umbrellas with lights, and solar lights from which hanging platers can be suspended. What is lacking in the prior art is a hanging planter and light assembly comprising a plurality of posts extending between a top plate and bottom plate, with the top plate having a light and the bottom plate being configured for engaging a pot.

BRIEF SUMMARY OF THE INVENTION

An embodiment of the disclosure meets the needs presented above by generally comprising a plurality of a posts, which is engaged to and extends between a bottom plate and a top plate. A chain is engaged to and extends from the top plate and is configured to engage an article of mounting hardware mounted to a surface to hang the hanging planter and light assembly. A socket is engaged to a lower face of the top plate and is configured for threaded insertion of a bulb. A power cord is operationally engaged to the socket and is configured to operationally engage the socket to a source of electrical current. An orifice is positioned in the bottom plate and is configured for insertion of a pot. A plant can be grown in the pot and the bulb can provide illumination to an area proximate to the hanging planter and light assembly.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
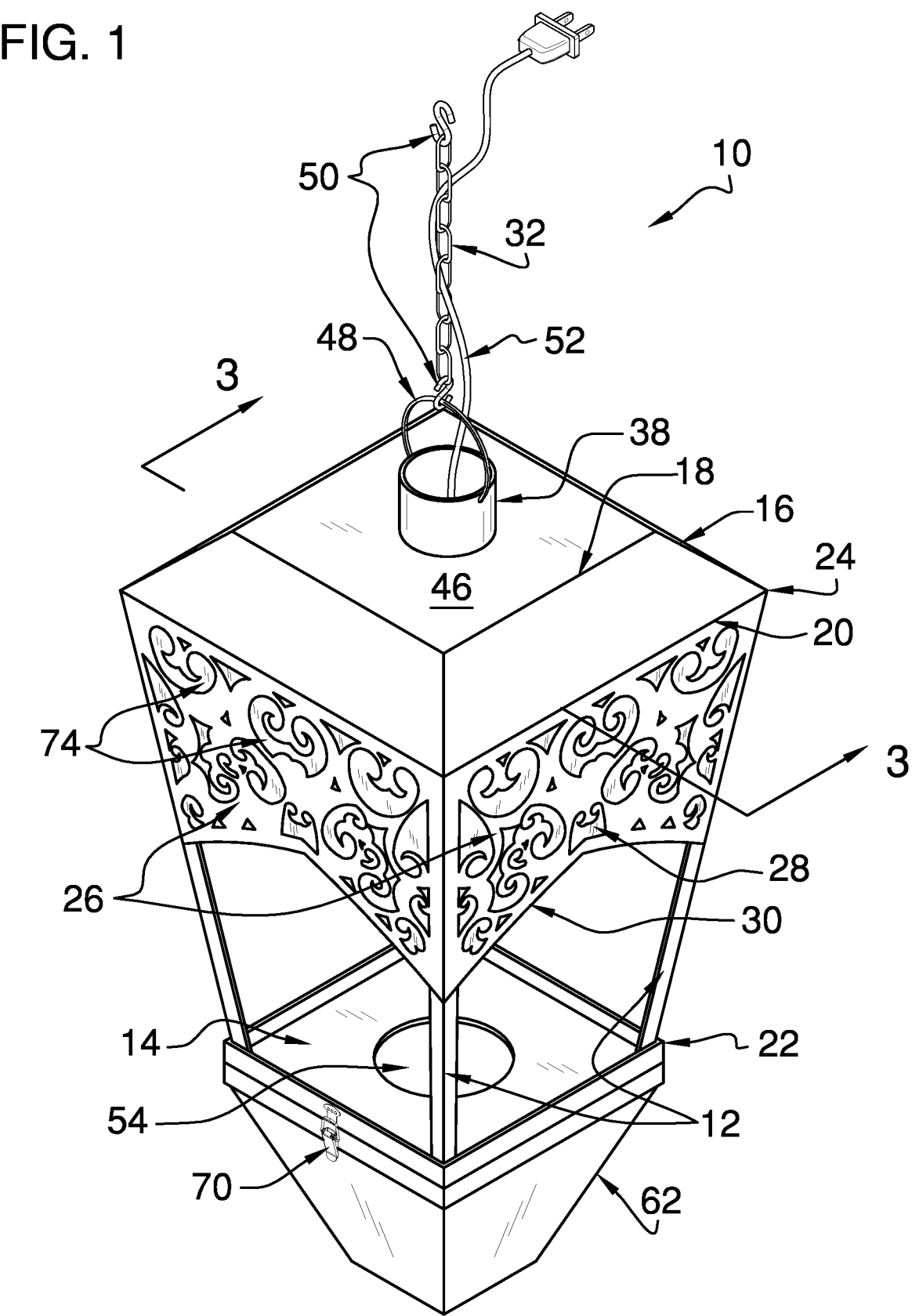
FIG. 1 is an isometric perspective view of a hanging planter and light assembly according to an embodiment of the disclosure.

With reference now to the drawings, and in particular to FIGS. 1 through 5 thereof, a new planter and light assembly embodying the principles and concepts of an embodiment of the disclosure and generally designated by the reference numeral 10 will be described.

Figure 2:
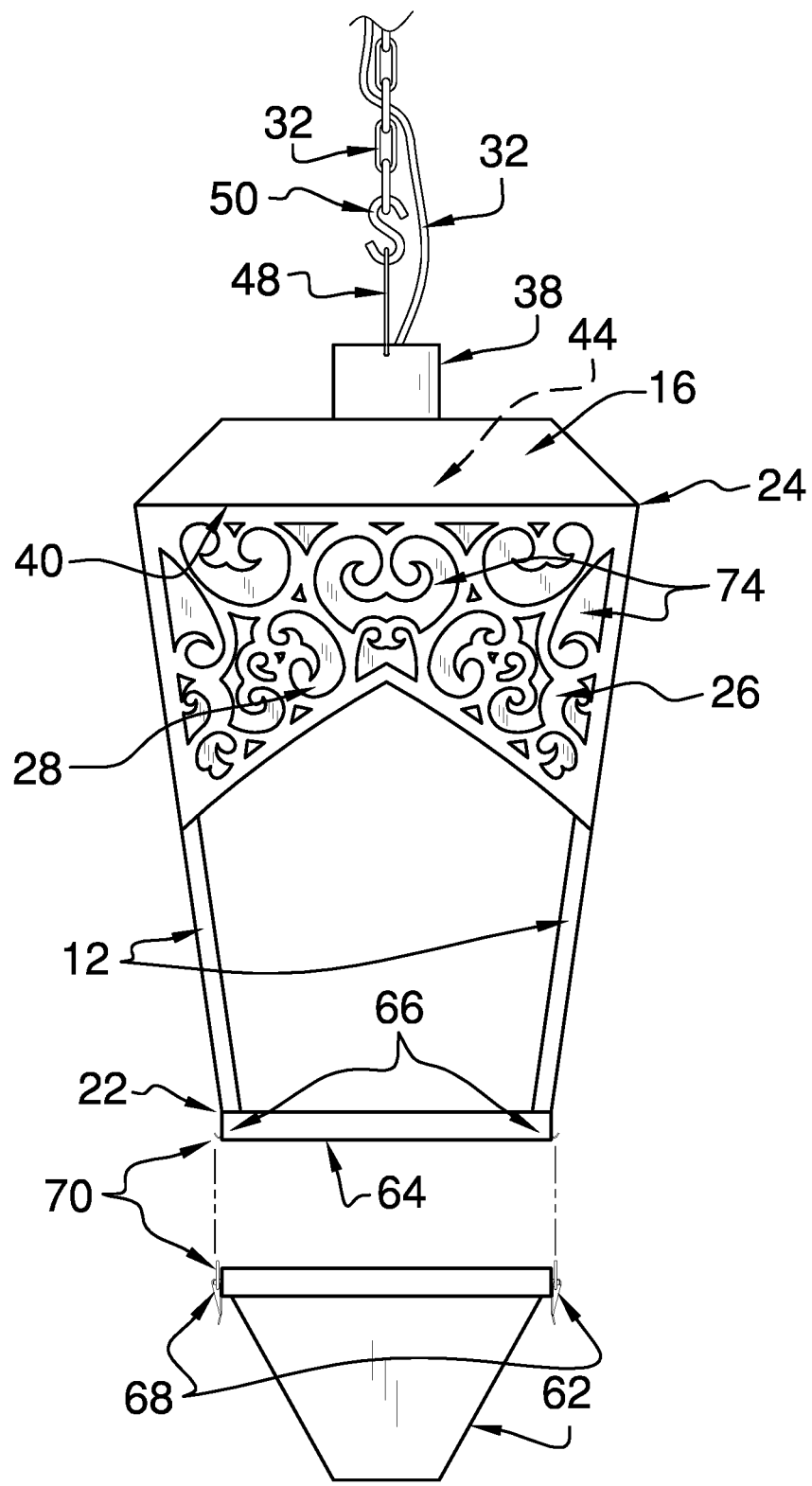
FIG. 2 is an exploded view of an embodiment of the disclosure.
Figure 3:
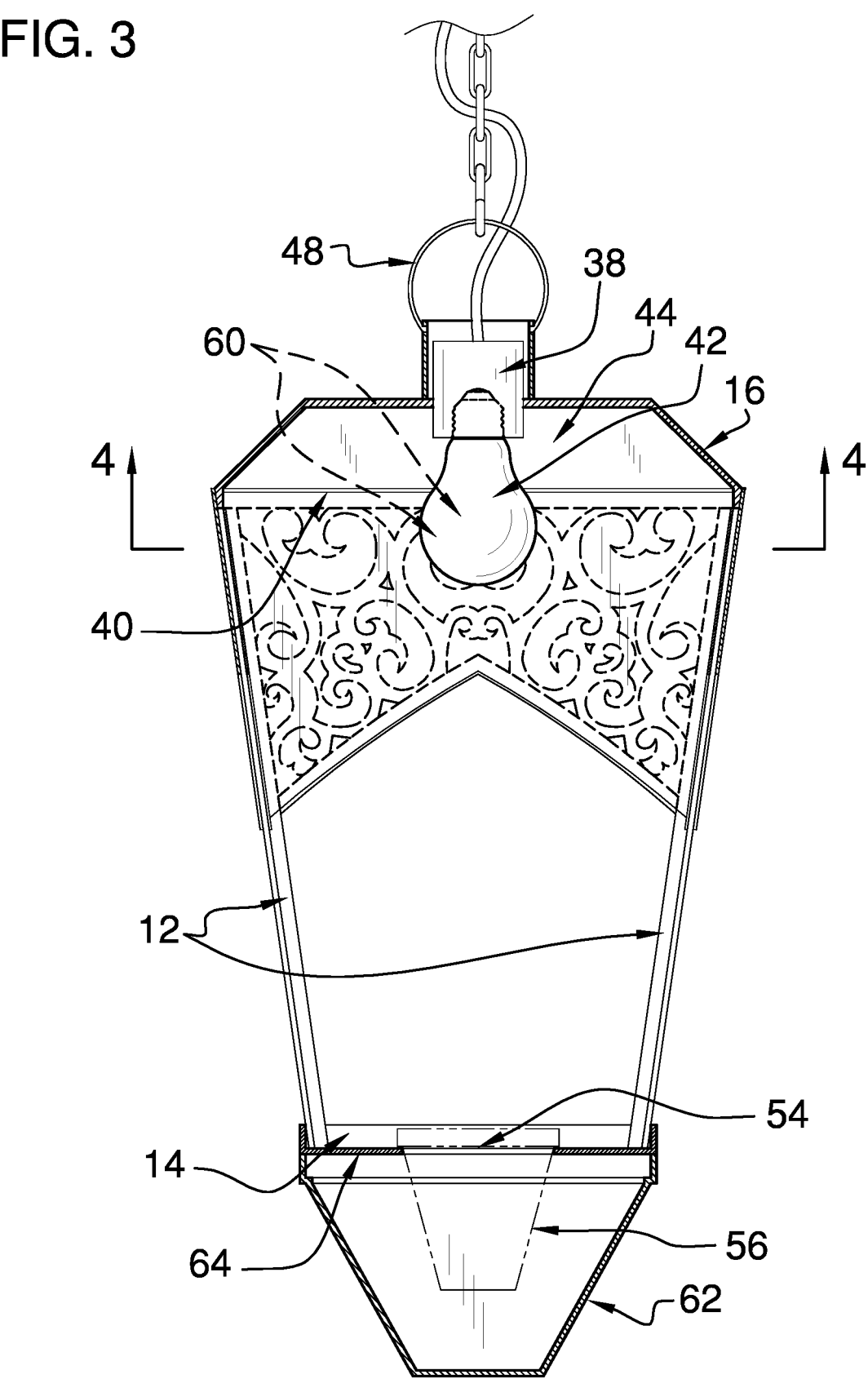
FIG. 3 is a cross-sectional view of an embodiment of the disclosure.
Figure 4:
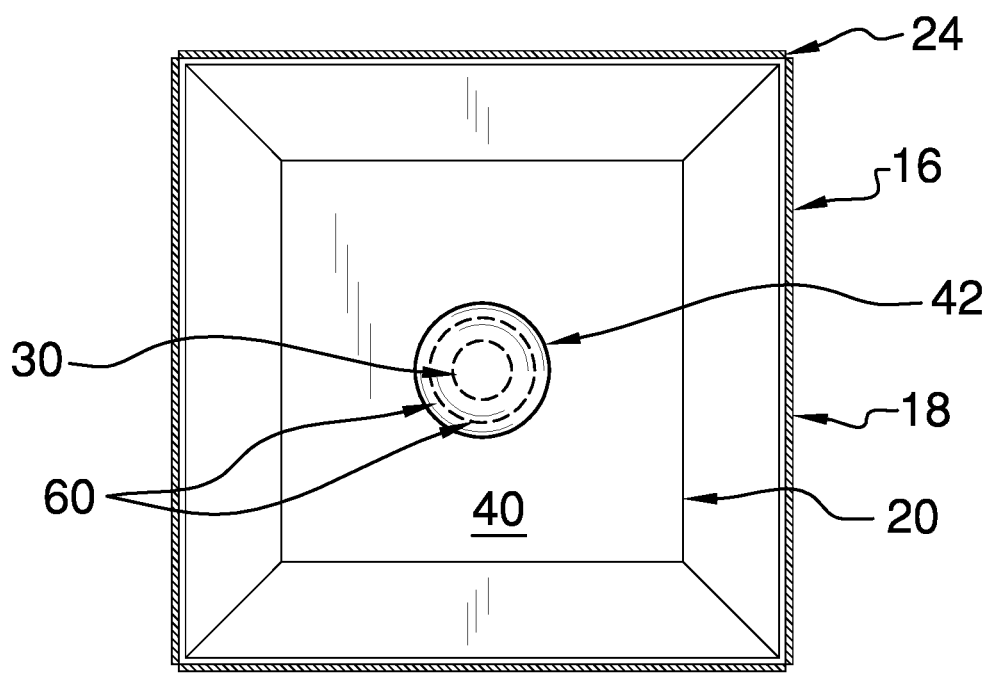
FIG. 4 is a bottom view of an embodiment of the disclosure.

As best illustrated in FIGS. 1 through 5, the hanging planter and light assembly 10 generally comprises a plurality of a posts 12, which is engaged to and extends between a bottom plate 14 and a top plate 16. The top plate 16 may be circumferentially larger than the bottom plate 14, as shown in FIG. 2, although the present invention also anticipates the top plate 16 being circumferentially smaller than the bottom plate 14, as well as the top plate 16 and the bottom plate 14 being circumferentially equivalent. The bottom plate 14 and the top plate 16 may be squarely shaped, as shown in FIG. 1, or alternatively shaped, such as, but not limited to, circularly, ovally, pentagonally, and the like. The top plate 16 has an upper limit 18 and a lower limit 20, with the upper limit 18 being circumferentially smaller than the lower limit 20, rendering the top plate 16 square frustum shaped.

The plurality of posts 12 may comprises four posts 12, as shown in FIG. 1, with each post 12 extending from proximate to a corner 22 of the bottom plate 14 to proximate to a corner 24 of the top plate 16. The present invention anticipates the plurality of posts 12 comprising other numbers of posts 12, such as, but not limited to, three posts 12, five posts 12, and the like.

Each of a plurality of panels 26 is engaged to the top plate 16 and a respective pair of adjacently positioned posts 12 so that each pair of adjacently positioned posts 12 is spanned by a respective panel 26. The panel 26 extends toward the bottom plate 14. The panels 26, or portions 74 of the panels 26, are transparent translucent, or comprise a void 28 so that light passes through. A lower edge 30 of the panel 26 is inverted V-shaped. The top plate 16, the bottom plate 14, the posts 12, and the panels 26 thus have a Victorian appearance.

Figure 5:
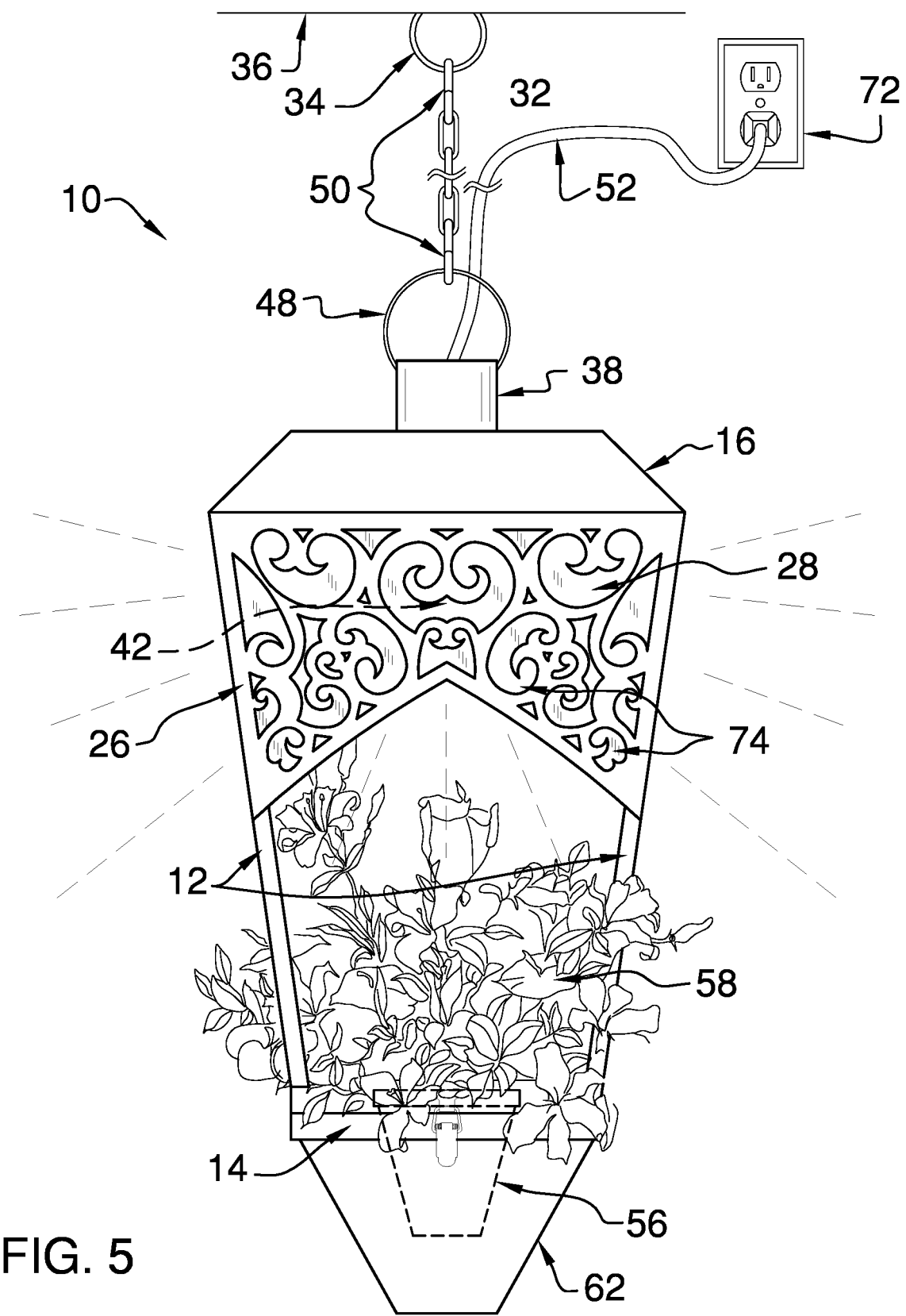
FIG. 5 is an in-use view of an embodiment of the disclosure.

A chain 32 is engaged to and extends from the top plate 16 and is configured to engage an article of mounting hardware 34 mounted to a surface 36, such as a ceiling, beam, wall, or the like, to hang the hanging planter and light assembly 10, as shown in FIG. 5.

A socket 38 is engaged to a lower face 40 of the top plate 16 and is configured for threaded insertion of a bulb 42. A recess 44 extends into the lower face 40 of the top plate 16. The socket 38 is positioned in the recess 44 and protrudes from an upper face 46 of the top plate 16. A ring 48 engaged to the socket 38, with the chain 32 being engaged to and extending from the ring 48. A pair of S-hooks 50 may be used to engage the chain 32 to the ring 48 and to the article of mounting hardware 34.

A power cord 52 is operationally engaged to the socket 38 and is configured to operationally engage the socket 38 to a source of electrical current. The power cord 52 may extend loopedly through the chain 32, as shown in FIG. 1.

An orifice 54 is positioned in the bottom plate 14 and is configured for insertion of a pot 56. A plant 58 can be grown in the pot 56 and the bulb 42 can provide illumination to an area proximate to the hanging planter and light assembly 10. A bulb 42 comprising a plurality of light emitting diodes 60 would be beneficial to the plant 58.

A vessel 62 is selectively engageable to the bottom plate 14, as shown in FIG. 2, so that the vessel 62 extends from a lower surface 64 of the bottom plate 14. The vessel 62 is configured to retain water dripping from the pot 56 positioned in the orifice 54. With the bottom plate 14 being squarely shaped, the vessel 62 is inverted square frustum shaped.

A set of first fasteners 66 engaged to the bottom plate 14. A set of second fasteners 68 engaged to the vessel 62. The second fasteners 68 are complementary to the first fasteners 66 so that each second fastener 68 is selectively engageable to a respective first fastener 66 to removably engage the vessel 62 to the bottom plate 14. The second fastener 68 and the respective first fastener 66 may comprise a clasp 70, or other fastening means, such as, but not limited to, cam locks, hook and loop fasteners, and the like.

In use, the chain 32 is engaged to the article of mounting hardware 34 to mount the hanging planter and light assembly 10 to the surface 36. A bulb 42 is threadedly inserted into the socket 38. The power cord 52 is plugged into an electrical outlet 72 to operationally engage the socket 38 and the bulb 42 to a source of electrical current. A pot 56 is inserted into the orifice 54 and a plant 58 is positioned in the pot 56.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A hanging planter and light assembly comprising:
    a bottom plate and a top plate;
    a plurality of posts engaged to and extending between the bottom plate and the top plate;
    a chain engaged to and extending from the top plate, wherein the chain is configured for engaging an article of mounting hardware mounted to a surface;
    a socket engaged to a lower face of the top plate, wherein the socket is configured for threaded insertion of a bulb;
    a power cord operationally engaged to the socket, wherein the power cord is configured for operationally engaging the socket to a source of electrical current; and
    an orifice positioned in the bottom plate, wherein the orifice is configured for insertion of a pot.

2. The hanging planter and light assembly of claim 1, wherein the top plate is circumferentially larger than the bottom plate.

3. The hanging planter and light assembly of claim 1, wherein the bottom plate and the top plate are squarely shaped.

4. The hanging planter and light assembly of claim 1, wherein the top plate has an upper limit and a lower limit, the upper limit being circumferentially smaller than the lower limit, such that the top plate is square frustum shaped.

5. The hanging planter and light assembly of claim 3, wherein the plurality of posts comprises four posts, each post extending from proximate to a corner of the bottom plate to proximate to a corner of the top plate.

6. The hanging planter and light assembly of claim 1, further including a plurality of panels, each panel being engaged to the top plate and a respective pair of adjacently positioned posts, such that each pair of adjacently positioned posts is spanned by a respective panel, the panel extending toward the bottom plate, the panel or portions of the panel being transparent, translucent, or comprising a void.

7. The hanging planter and light assembly of claim 6, wherein a lower edge of the panel is inverted V-shaped.

8. The hanging planter and light assembly of claim 1, further including:
    the socket protruding from an upper face of the top plate; and
    a ring engaged to the socket, the chain being engaged to and extending from the ring.

9. The hanging planter and light assembly of claim 1, further including a recess extending into the lower face of the top plate, the socket being positioned in the recess.

10. The hanging planter and light assembly of claim 1, wherein the power cord extends loopedly through the chain.

11. The hanging planter and light assembly of claim 1, further including a vessel selectively engageable to the bottom plate, such that the vessel extends from a lower surface of the bottom plate, wherein the vessel is configured for retaining water dripping from the pot positioned in the orifice.

12. The hanging planter and light assembly of claim 3, wherein further including a vessel selectively engageable to the bottom plate, such that the vessel extends from a lower surface of the bottom plate, the vessel being inverted square frustum shaped, wherein the vessel is configured for retaining water dripping from the pot positioned in the orifice.

13. The hanging planter and light assembly of claim 11, further including:
   a set of first fasteners engaged to the bottom plate; and
   a set of second fasteners engaged to the vessel, the second fasteners being complementary to the first fasteners, such that each second fastener is selectively engageable to a respective first fastener for removably engaging the vessel to the bottom plate, the second fastener and the respective first fastener comprising a clasp.

14. A hanging planter and light system comprising:
   a bottom plate and a top plate;
   a plurality of posts engaged to and extending between the bottom plate and the top plate;
   an article of mounting hardware mounted to a surface;
   a chain engaged to and extending from the top plate, the chain being engaged to the article of mounting hardware;
   a socket engaged to a lower face of the top plate;
   a bulb threadedly inserted into the socket;
   a power cord operationally engaged to the socket, the power cord being operationally engaged to an electrical outlet, such that the socket is operationally engaged to a source of electrical current;
   an orifice positioned in the bottom plate;
   a pot inserted into the orifice; and
   a plant positioned in the pot.

15. A hanging planter and light assembly comprising:
   a bottom plate and a top plate, the top plate being circumferentially larger than the bottom plate, the bottom plate and the top plate being squarely shaped, the top plate having an upper limit and a lower limit, the upper limit being circumferentially smaller than the lower limit, such that the top plate is square frustum shaped;
   a plurality of posts engaged to and extending between the bottom plate and the top plate, the plurality of posts comprising four posts, each post extending from proximate to a corner of the bottom plate to proximate to a corner of the top plate;
   a plurality of panels, each panel being engaged to the top plate and a respective pair of adjacently positioned posts, such that each pair of adjacently positioned posts is spanned by a respective panel, the panel extending toward the bottom plate, the panel or portions of the panel being transparent, translucent, or comprising a void, a lower edge of the panel being inverted V-shaped;
   a chain engaged to and extending from the top plate, wherein the chain is configured for engaging an article of mounting hardware mounted to a surface;
   a socket engaged to a lower face of the top plate, wherein the socket is configured for threaded insertion of a bulb, the socket protruding from an upper face of the top plate;
   a ring engaged to the socket, the chain being engaged to and extending from the ring;
   a recess extending into the lower face of the top plate, the socket being positioned in the recess;
   a power cord operationally engaged to the socket, wherein the power cord is configured for operationally engaging the socket to a source of electrical current, the power cord extending loopedly through the chain;
   an orifice positioned in the bottom plate, wherein the orifice is configured for insertion of a pot;
   a vessel selectively engageable to the bottom plate, such that the vessel extends from a lower surface of the bottom plate, wherein the vessel is configured for retaining water dripping from the pot positioned in the orifice, the vessel being inverted square frustum shaped;
   a set of first fasteners engaged to the bottom plate; and
   a set of second fasteners engaged to the vessel, the second fasteners being complementary to the first fasteners, such that each second fastener is selectively engageable to a respective first fastener for removably engaging the vessel to the bottom plate, the second fastener and the respective first fastener comprising a clasp.

* * * * *